United States Patent [19]

Laurent et al.

[11] Patent Number: 4,862,829

[45] Date of Patent: Sep. 5, 1989

[54] METHOD OF CALMING LAYING POULTRY

[75] Inventors: Sebastian M. Laurent, Greenwell Springs; Robert N. Sanders, Baton Rouge, both of La.

[73] Assignee: Ethyl Corporation, Richmond, Va.

[21] Appl. No.: 934,461

[22] Filed: Nov. 24, 1986

Related U.S. Application Data

[60] Continuation-in-part of Ser. No. 846,188, Mar. 31, 1986, abandoned, which is a continuation of Ser. No. 741,572, Jun. 5, 1985, abandoned, which is a division of Ser. No. 475,370, Mar. 14, 1983, Pat. No. 4,556,564.

[51] Int. Cl.$^4$ .................. A01N 59/06; A01K 29/00
[52] U.S. Cl. ............................................. 119/1; 426/2
[58] Field of Search .................. 119/1; 426/2, 298

[56] References Cited

U.S. PATENT DOCUMENTS

| | | | |
|---|---|---|---|
| 3,836,676 | 9/1974 | Komakine | 426/74 |
| 4,437,429 | 3/1984 | Goldstein et al. | 119/1 |
| 4,515,780 | 5/1985 | Laurent et al. | 424/154 |
| 4,537,771 | 8/1985 | Greb et al. | 424/154 |
| 4,556,564 | 12/1985 | Laurent et al. | 426/2 |
| 4,610,883 | 9/1986 | Laurent et al. | 426/2 X |

FOREIGN PATENT DOCUMENTS

| | | |
|---|---|---|
| 939186 | 1/1974 | Canada. |
| 0119992 | 9/1984 | European Pat. Off.. |
| 59-203450 | 11/1984 | Japan. |

OTHER PUBLICATIONS

Ethyl Corporation Brochure *Which Can We Improve... The Chicken or the Egg?*, Jan. 1986 version.
Ethyl Corporation Brochure, *Which Can We Improve... The Chicken or the Egg?*, revised version subsequent to Dec. 30, 1986.
Chung et al, *Nongsa Sihom Youngu Pogo*, 1978, 20 (livestock), pp. 77–83.
Mumpton et al, The Application of Natural Zeolites in Animal Science and Aquaculture, *Journal of Animal Science* 45, No. 5, 1188–1203 (1977).
Willis et al, *Poultry Science* 61, 438–442 (1982).
Vest et al, *Zeo-Agriculture* '82.
Nakaue et al, *Poultry Science*, 60, 944–949 (1981).
Great Lakes Science Advisory Board of the Internat'l Joint Commission on the Health Implications of Non-NTA Deterg. Bldrs., 10/80, Rev. 3/81.
Gloxhuber et al, *Chemical Toxicology* 21:2, pp. 209–220 (1983).
Nolenet al, *Food & Cosmetic Toxicology*, 21 (5), p. 697 (1983).
Cook et al, Zeolite A Hydrolysis & Degradation, *Environ Sci. Technol.* 16(6), pp. 344–350 (1982).
Benke et al, *Food & Cosmetic Toxicology*, 17, pp. 123–127 (1979).
Anon, *Tentative Evaluation of the Health Aspects of Certain Silicates as Food Ingredients* (1977).
Carlisle, *Nutrition Reviews* 40(7), pp. 193–198 (1982).
Carlisle, Chap. 4, *Silicon & Siliceous Structures in Biol. Systems*, Simpson T. L., ed. B. E. Springer Verlag, NY (1981), pp. 69–94.
Berlyne et al, *Nephron*, 43, pp. 5–9, (1986).
Charnot et al, *Annales D' Endocronologie*, 32, pp. 397–402 (1971).
Charnot et al, Silicon Endocrine Bal. & Min. Metabolism, in Biochem, of Silicon & Related Prod.'s, Bendz et al, Ed. Plenum Press, NY, pp. 269–280 (1979).
Merkley et al, *Poultry Science*, 62, pp. 798–804 (1983).
Reagan, Luther M., Effects of Adding Zeolites to the Diets of Broiler Cockerels; Thesis; Colo. State Univ., 4/25/84.
Edwards, *Poultry Science*, vol. 65, Supp. No. 1 (1986).
Roland et al, *Poultry Science*, 64, 1177–87 (1985).
Miles et al, *Nutrition Reports International* 34, No. 6, 1097 (Dec. 1986).
Ingram et al, *Influence of ETHACAL ® Feed Component on Production Parameters of White Leghorn Hens During High Temp.'s.*

*Primary Examiner*—Robert P. Swiatek
*Attorney, Agent, or Firm*—John F. Sieberth

[57] ABSTRACT

A method of calming or decreasing the activity of laying poultry and thereby reduce their production of undesirable body-checked eggs by adding an effective amount of zeolite A up to about 4.0 weight percent of the feed, to the feed of the laying poultry, and regularly feeding the laying poultry the feed containing zeolite A.

20 Claims, No Drawings

METHOD OF CALMING LAYING POULTRY

CROSS-REFERENCE TO RELATED APPLICATIONS

This application is a continuation-in-part of application Ser. No. 846,188 filed on Mar. 31, 1986, now abandoned, which is a continuation of application Ser. No. 741,572 filed on June 5, 1985, now abandoned, which in turn is a division of application Ser. No. 475,370 filed on Mar. 14, 1983, now U.S. Pat. No. 4,556,564.

BACKGROUND OF THE INVENTION

The present invention is in the general field of poultry farming and relates particularly to the feeding of poultry, particularly the feeding of laying hens.

The demand for poultry eggs, especially chicken eggs has expanded considerably over the last decade. The poultry industry has grown from a home industry to a large scale manufacturing industry in which tens of thousands of eggs are produced daily at single farms or egg laying installations. Some eggs are produced for eating and some eggs are produced for hatching.

One of the problems encountered in the commercial table egg production segment of the poultry industry is the undesirable production of eggs that are classified as "body-checked". A body-checked egg results when the shell of an egg that has been fully formed within the shell cavity of the hen is broken and then subsequently repaired by the hen prior to being laid. Such an egg will have a misshapen shell and is downgraded in the processing and grading plant. Downgrading reduces the value of the eggs of the body-checked category as much as $0.40 to $0.50 per dozen. This is a serious economic loss to the producer.

As hens get older, their tendency toward body-checked eggs increases because the overall shell quality of their eggs decreases and the eggs are thus more prone to breakage. Breakage of shells while still in the body of the hen is aggravated by hyperactivity, such as jumping around in the cages. Current industry practice is to house several hens, usually four, in one cage. Activity in these multiple hen cages further aggravates the problem.

It is therefore an important object of the present invention to provide a means for calming the hens, thereby decreasing the production of "body-checked" or other undesirable eggs.

It has been found that the inclusion of small amounts of zeolite such as zeolite A in the diets of commercial table egg producing hens results in a calming effect on the hens and thus a substantial reduction in the percentage of their eggs that will be body-checked.

Various types of zeolites, mainly naturally occurring zeolites or those found in nature, have been fed to a variety of animals, in various amounts, including chickens, for a variety of reasons and with various results, mostly unfavorable.

In addition to increasing eggshell strength in laying hens as described in our U.S. No. 4,556,564, improving feed utilization efficiency in poultry and larger egg size as described in our U.S. No. 4,610,882, decreasing the mortality rate of poultry as described in our U.S. No. 4,610,883, and increasing the bone strength of animals, including humans, as set forth in our copending U.S. application Ser. No. 801,596, as a result of our continuing studies it has been discovered that the regular feeding of small amounts of zeolite A to poultry produces the following positive results:

1. Calmer birds, reduced activity (layers)
2. Larger egg size (layers and broiler breeders)
3. Extended lay cycle duration (layers and broiler breeders)
4. Reduced carcass condemnation (broilers)
5. Improved feathering (broilers)

Calmer birds produce more, less deformed eggs and lay with greater regularity. The advantages of larger eggs, extended lay cycles and reduced condemnations are self-evident. Stress in layers is a highly negative factor. Improved feathering correlates with healthier and stronger birds.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2.Al_2O_3 \cdot xSiO_2 \cdot yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85 \pm 0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0 \pm 0.2\ Na_2O \cdot Al_2O_3 \cdot 1.85 \pm 0.5\ SiO_2 \cdot yH_2O$$

In the formula, "y" may be any value up to 6.

An ideal zeolite A has the following formula:

$$(NaAlSiO_4)_{12} \cdot 27H_2O$$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the Kα doublet of copper and a Geiger counter spectrometer with a strip chart pen recorder is used. The peak heights, I, and the positions as a function of 2θ where θ is the Bragg angle, are read from a spectrometer chart. From these, the relative intensities, 100 $I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I
X-RAY DIFFRACTION PATTERN FOR ZEOLITE A

| $h^2 + k^2 + l^2$ | d (Å) | $\frac{100\ I}{I_o}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table II.

TABLE II
MOST SIGNIFICANT d VALUES FOR ZEOLITE A

| d Value of Reflection in Å |
|---|
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the Journal of Animal Science, Vol. 45, No. 5 (1977) pp. 1188–1203.

U.S. Pat. No. 3,836,676 issued to Chukei Komakine in 1974 discloses the use of zeolites as adsorbent moisture of ferrous sulfate crystals in an odorless chicken feed comprising such crystals and chicken droppings. The results were said to be no less than those in the case where chickens were raised with ordinary feed.

Canadian patent No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

An article by C. Y. Chung et al from Nongsa Sihom Youngu Pogo 1978, 20 (Livestock) pp. 77–83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976- Suweon, Korea) showed that no significant difference was observed when 1.5, 3, and 4.5 percent zeolite was added to chicken layer diets.

A study by H. S. Nakaue of feeding White Leghorn layers clinoptilolite, reported in 1981 Poultry Science 60:944-949, disclosed no significant differences in eggshell strength between hens receiving the zeolite in their diet and hens not receiving the zeolite in their diet.

In a recent study at the University of Georgia, both broilers and layers were fed small amounts (about 2%) of clinoptilolite, a naturally occurring zeolite from Tilden, Texas. The eggshells from the hens receiving zeolite were slightly more flexible as measured by deformation, slightly less strong as measured by Instron breaking strength, and had a slightly lower specific gravity. The differences in eggshell quality were very small. This type of zeolite was ineffective in producing a stronger eggshell. An article written by Larry Vest and John Shutze entitled "The Influence of Feeding Zeolites to Poultry Under Field Conditions" summarizing the studies was presented at Zeo-Agriculture '82.

It is an important object of the present invention to decrease the hyperactivity of female poultry by feeding a feed to the female poultry which contains a small effective amount of zeolite A.

It is another object of the invention to provide a decrease in body-checked eggs of laying hens by feeding the hens a feed containing a small amount of zeolite A sufficient to substantially decrease the numbers of body-checked eggs which might otherwise, but for the zeolite A, be produced.

Another object of the invention is to provide an improved process for increasing the effective egg production of laying poultry wherein an effective amount of zeolite A is added to the diet of the laying poultry.

Still another object of the invention is to cost effectively decrease the production of undesirable eggs of laying poultry.

Other objects and advantages of the invention will be more fully understood from a reading of the description and claims hereinafter.

SUMMARY OF THE INVENTION

The present invention relates to a method of calming laying poultry or hens wherein a small effective amount of zeolite, especially zeolite A, is added to the feed of the laying poultry.

DESCRIPTION OF THE PREFERRED EMBODIMENT

It has been discovered that the addition of a relatively small amount of zeolite A to a regular or standard feed for laying hens, especially chickens, produces a desirable calming effect on the laying hens, thereby substantially increasing the numbers of desirable eggs. Zeolite A is added in amounts of from about 0.25 percent to about 4.00 percent of weight of the total feed fed to the laying hens and more preferably in amounts of about 0.75 to 3.5 weight percent.

A typical feed preparation for large scale poultry operations could comprise the following by weight percent:

| | |
|---|---|
| Corn | 50–70 |
| Soybean Meal | 15–25 |
| Limestone | 5–9 |
| Alfalfa Meal | 1 |
| Phosphates | 0.8–2.0 |
| Vitamins, Amino Acids | |
| Salt and Other Minerals | 0.1–1.0 |

Zeolite A is added to such feed formulation in small amounts by weight percent of up to about four. Greater amounts may be used, but may deprive the poultry of the desired amount of nutrients. Greater amounts are also likely to be cost ineffective. A particularly preferred amount of zeolite A is from about one-half to about two percent by weight of the total feed formulation. A most preferred amount of zeolite A is about 0.75 to about 1.50 weight percent of the total feed formulation.

Using Ethyl EZA ® zeolite, a commercially available sodium zeolite A, a number of tests were conducted to determine the effect of zeolites on production of body-checked eggs.

Two large poultry houses having identical hen populations of 15,000 62 week old hens each were used. The diets fed to these old hens in the two houses were identical in every way except that 0.75% zeolite A was added to the diet of the hens of one of the houses for a period of six weeks. Data was taken for three weeks prior to addition of the zeolite and again for two weeks after the six week test period. A summary of the data is shown in the following table:

| Zeolite in Diet | Average Percentage of Body-Checks | | |
|---|---|---|---|
| | Pretreatment Period | Treatment Period | Posttreatment Period |
| 0 | 23.51 | 16.78 | 18.74 |
| 0.75 | 22.10 | 12.20 | 25.15 |

The data show that during the pretreatment period the percent of body-checks was about equal in the two houses. During the treatment period the percent of body-checks had dropped almost 50 percent in the house in which the hens were fed zeolite A in their diets; and during the posttreatment period when the zeolite A had been removed from the diet the percent of bodychecks was again as high as they had been in the pretreatment period.

In another feeding test with 32,000 hens at a different location the percentage of body-check eggs during the treatment period with 0.75% zeolite A in the diet was 44 percent lower than the pretreatment period and 57 percent lower than the posttreatment period. Only one test house was used in this second trial.

Body-checked eggs are also a problem with hatching eggs. The shell is a very important participating factor in the incubation and hatching process. The porosity of the shell is important to the respiration and transpiration of air and humidity in the incubator. Body-checked eggs do not have uniform porosity and thus result in poor embryo growth and survivability. Hatching eggs in the broiler industry have a value some four times as great as table eggs. The value of hatching eggs in the turkey industry is about $1.00 each. The inclusion of zeolite A in the diets of hatching egg producing hens would be of high economic importance.

The diet fed to the poultry consisted principally of corn supplemented with a soybean meal (SBM) and limestone. Smaller amounts of alfalfa meal, dicalcium phosphate (DiCalP), a synthetic amino acid (DL-methionine), salt, a commercial vitamin and mineral supplement for layers (Micro-Mix) were added. Each diet assured that the poultry received all of the required nutrients and minerals.

The term poultry includes all domestic fowl, namely chickens, turkeys, ducks, geese, and the like. Corn is the principal diet for most poultry. A feed formulation comprising by weight percent the following is desirable:

|  | Weight Percent |
| --- | --- |
| corn | 50–75 |
| soybean meal | 10–30 |
| calcium carbonate | 4–10 |
| zeolite A | 0.25–4.0 |

Calcium carbonate is usually in the form of natural limestone ground to a suitable particle size, but sometimes oyster shells which have also been suitably ground are used.

It can be appreciated that a wide variety of nutrients or foods may be included in the diets of layers or poultry laying hens. In a controlled environment, the hens are only exposed to desired foods or food products. A typical laying ration composition contains the following:

|  | Weight Percent |
| --- | --- |
| crude protein - not less than | 16.0 |
| crude fat - not less than | 2.5 |
| crude fiber - not more than | 7.0 |
| calcium (as Ca) - not less than | 3.1 |
| calcium (as Ca) - not more than | 4.1 |
| phosphorus (P) - not less than | 0.4 |
| iodine (I) - not less than | 0.0001 |
| salt (NaCl) - not less than | 0.1 |
| salt (NaCl) - not more than | 0.5 |

The foregoing composition is obtained from or includes the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers'yeast. All of these are protein sources.

Roughage or fiber. Includes dehydrated alfalfa, alfalfa hay, alfalfa leaf meal and pasture grasses. These are all fiber Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL-methionine, choline chloride, folic acid, dicalcium phosphate, magnesium sulfonate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin and sodium sulfite.

In general, a feed composition for poultry should preferably contain by weight percent the following:

|  | Weight Percent |
| --- | --- |
| crude protein - at least about | 14 |
| crude fat - at least about | 2 |
| crude fiber - not more than about | 7 |
| calcium - about | 2.7 to 4.1 |
| phosphorous - at least about | 0.05 |
| iodine - at least | 0.0001 |
| sodium - about | 0.1 to 0.4 |
| chlorine - about | 0.1 to 0.5 |
| zeolite A - about | 0.25 to 4.0 |

The foregoing disclosure and description of the invention is illustrative and explanatory thereof and various changes in the illustrated process may be made within the scope of the appended claims without departing from the spirit of the invention.

What is claimed is:

1. A method of calming the activity of laying poultry wherein an amount of zeolite A from about 0.25 to about 3.5 weight percent of feed is added to the feed of the laying poultry and the feed is regularly fed to the laying poultry such that the activity of such poultry is calmed.

2. The method of claim 1, wherein the amount of zeolite A added to the feed of the laying poultry is about 0.75 weight percent.

3. A method of reducing the hyperactivity of laying poultry, wherein zeolite A in an amount of from about 0.25 percent to about 4.0 weight percent of feed is added to the feed of the laying poultry and regularly fed to the laying poultry such that the hyperactivity of such poultry is reduced.

4. The method of claim 3, wherein the zeolite A fed to the laying poultry is in an amount of 0.75 weight percent.

5. The method of claim 3, wherein the zeolite A fed to the laying poultry is in an amount of from about 0.75 to about 3.5 weight percent.

6. The method of claim 3, wherein the zeolite A fed to the laying poultry is in an amount of from about 0.75 percent to about 1.50 percent by weight of feed.

7. A method of decreasing the production of body-checked eggs by laying poultry, said method comprising feeding to said poultry a feed containing an amount of zeolite A sufficient to decrease the production of such eggs compared to that of non-zeolite fed laying poultry, said feed comprising in weight percent the following:

| | |
|---|---|
| crude protein | at least 14 |
| crude fat | at least 2 |
| crude fiber | not more than 7.0 |
| calcium | about 2.7 to 4.1 |
| phosphorus | at least 0.4 |
| iodine | at least 0.0001 |
| sodium | about 0.1 to 0.4 |
| chloride | about 0.1 to 0.5 |
| zeolite A | about 0.25 to 4.0. |

8. The method of claim 7, wherein the feed fed to the laying poultry comprises by weight percent the following:

| | |
|---|---|
| crude protein | at least 16 |
| crude fat | at least 2.5 |
| crude fiber | not more than 7.0 |
| calcium | about 3.1 to 4.1 |
| phosphorus | at least 0.5 |
| iodine | at least 0.0001 |
| sodium | about 0.1 to 0.3 |
| chloride | about 0.1 to 0.3 |
| zeolite A | about 0.25 to 4.00. |

9. A method of decreasing the production of body-checked eggs by laying poultry which comprises:
(a) reducing hyperactivity in a population of egg-lying poultry by feeding said population of egg-laying poultry a feed having admixed therewith an amount of up to about four weight percent of zeolite A sufficient, and for a period of time sufficient, to reduce such hyperactivity; and
(b) recovering from the so-fed population of egg-laying poultry a quantity of eggs having a lower percentage of body-checked eggs than produced by a poultry population fed the same feed but not containing zeolite A.

10. The method of claim 9, wherein the amount of zeolite A added to the feed of the laying poultry is from about 0.25 percent to 3.5 weight percent.

11. The method of claim 9, wherein said zeolite A in said feed of the laying poultry is about 0.75 weight percent.

12. The method of claim 9, wherein the amount of zeolite A added to the feed of the laying poultry is about 1.5 weight percent.

13. The method of claim 9, wherein the amount of zeolite A added to the feed of the laying poultry is about 0.75 to about 1.5 weight percent.

14. The method of claim 9, wherein the feed fed to the laying poultry comprises principally corn, and about 0.25 to about 3.50 percent by weight of zeolite A.

15. The method of claim 9, wherein the feed fed to the laying poultry comprises by weight percent, 50–75 percent corn, 10–30 percent soybean meal and 4–10 percent calcium carbonate, and about 0.25 percent to about 4.0 percent by weight of zeolite A.

16. The method of claim 15, wherein the feed fed to the laying poultry contains zeolite A in an amount of about 0.75 to about 1.5 weight percent.

17. The method of claim 9, wherein the feed fed to the laying poultry comprises proteins, fats, carbohydrates, minerals and vitamins and about 0.25 to about 4.0 percent by weight of zeolite A.

18. The method of claim 9, wherein the laying poultry are chickens.

19. The method of claim 9, wherein the laying poultry are turkeys.

20. The method of claim 9, wherein the laying poultry are selected from the group consisting of turkeys, geese and ducks.

* * * * *